Figures 1, 2:
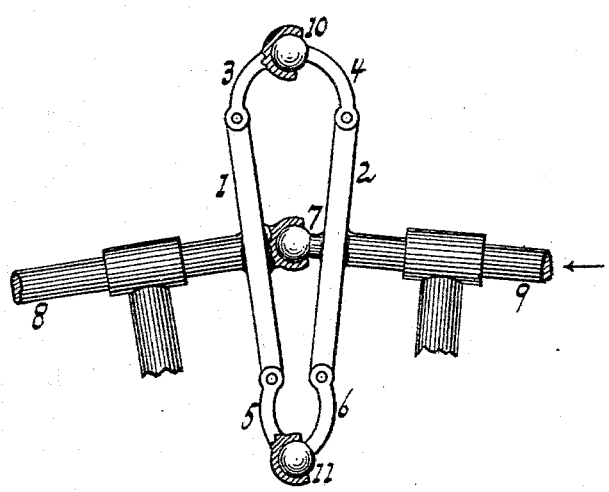

(No Model.)

G. P. FENNER.
UNIVERSAL JOINT.

No. 545,353. Patented Aug. 27, 1895.

WITNESSES:

INVENTOR:
George P. Fenner
BY
ATTORNEYS.

UNITED STATES PATENT OFFICE.

GEORGE P. FENNER, OF NEW LONDON, CONNECTICUT.

UNIVERSAL JOINT.

SPECIFICATION forming part of Letters Patent No. 545,353, dated August 27, 1895.

Application filed January 3, 1895. Serial No. 533,747. (No model.)

*To all whom it may concern:*

Be it known that I, GEORGE P. FENNER, a citizen of the United States, residing at New London, in the county of New London and State of Connecticut, have invented new and useful Improvements in Universal Joints, of which the following is a specification.

The object of this invention is to provide a universal joint comprising the novel features of construction set forth in the following specification and claims, and illustrated in the annexed drawings, in which—

Figure 1 is a side elevation of the joint. Fig. 2 is an end elevation of Fig. 1.

The pieces or heads 1 and 2 are fixed or secured to their respective shafts 8 and 9. To the pieces 1 and 2 are jointed the links 3, 4, 5, and 6. The links 3 and 4 are jointed to one another at 10 and the links 5 and 6 are jointed to one another at 11. The links are eccentrically jointed to the heads 1 and 2. The links 3, 4, 5, and 6 being of equal length, the ball-and-socket joints 10 and 11 will remain central between the pieces 1 and 2, although the rotation of said pieces 1 and 2 when inclined toward one another will cause the joints 10 and 11 to move toward and from the shafts 8 and 9 or toward and from the centers of the pieces 1 and 2, and the revolving motions of the shafts 8 and 9 are alike at all times.

In the drawings is shown a joint 7 at the centers of the pieces 1 and 2. This ball-and-socket joint 7 is not a necessity. I have also found that one pair of links, as 3 and 4, is sufficient for connecting the heads 1 and 2. As, however, but one pair of links is apt to disturb the balance, especially when revolving at a high rate of speed, it is of advantage to have oppositely-located link pairs as 3 4 and 5 6. As a single link pair would not be so durable as the link pairs 3 4 and 5 6, I prefer the latter arrangement. The links when used in connection with the central joint 7 will give a joint having steadiness and durability.

What I claim as new, and desire to secure by Letters Patent, is—

1. A joint, consisting of the shafts 8 and 9, the heads 1 and 2 rigidly fixed respectively to the shafts, and each having its ends lying at opposite sides of the shafts, and two pairs of links, the links of each pair being pivoted together, and the two pairs being symmetrically disposed and pivoted respectively to the ends of the heads at the opposite sides of the shafts, substantially as shown and described.

2. A joint comprising the pieces or heads 1 and 2 jointed centrally to one another, in combination with a link jointed to each piece, said links being jointed to one another substantially as described.

In testimony whereof I have hereunto set my hand in the presence of two subscribing witnesses.

GEORGE P. FENNER.

Witnesses:
NATHAN BABCOCK,
WALTER E. SPICER.